US011382327B2

(12) United States Patent
Edly

(10) Patent No.: US 11,382,327 B2
(45) Date of Patent: Jul. 12, 2022

(54) EMULSIFIABLE CONCENTRATE OF TEFLUTHRIN

(71) Applicant: SYNGENTA PARTICIPATIONS AG, Basel (CH)

(72) Inventor: Kal Edly, Greensboro, NC (US)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

(21) Appl. No.: 16/308,198

(22) PCT Filed: Jun. 2, 2017

(86) PCT No.: PCT/EP2017/063498

§ 371 (c)(1),
(2) Date: Dec. 7, 2018

(87) PCT Pub. No.: WO2017/211729

PCT Pub. Date: Dec. 14, 2017

(65) Prior Publication Data

US 2019/0289845 A1 Sep. 26, 2019

Related U.S. Application Data

(60) Provisional application No. 62/348,059, filed on Jun. 9, 2016.

(30) Foreign Application Priority Data

Jun. 29, 2016 (GB) ..................................... 1611288

(51) Int. Cl.

| | |
|---|---|
| *A01N 25/04* | (2006.01) |
| *A01N 25/30* | (2006.01) |
| *A01N 53/00* | (2006.01) |
| *A01N 25/02* | (2006.01) |

(52) U.S. Cl.

CPC ............. *A01N 25/04* (2013.01); *A01N 25/02* (2013.01); *A01N 25/30* (2013.01); *A01N 53/00* (2013.01)

(58) Field of Classification Search

CPC ........ A01N 25/04; A01N 25/02; A01N 25/30; A01N 53/00

See application file for complete search history.

(56) References Cited

U.S. PATENT DOCUMENTS 5,334,585 A 8/1994 Derian et al.

FOREIGN PATENT DOCUMENTS

| | | | | |
|---|---|---|---|---|
| EP | 0839477 A1 | | 5/1998 | |
| JP | 592901 A | | 4/1993 | |
| JP | 2010535741 A | | 11/2010 | |
| WO | 1998026655 A1 | | 12/1997 | |
| WO | 1998000010 A1 | | 1/1998 | |
| WO | 2007028287 A1 | | 3/2007 | |
| WO | 2009019299 A2 | | 2/2009 | |
| WO | WO2009019299 | * | 2/2009 | |
| WO | WO-2009019299 A2 | * | 2/2009 | ............. A01N 25/02 |
| WO | 2009103725 A2 | | 8/2009 | |
| WO | WO2009103725 | * | 8/2009 | |
| WO | WO2009103725 A3 | * | 8/2009 | |
| WO | 2011082162 A1 | | 7/2011 | |
| WO | 2016118699 A1 | | 7/2016 | |

OTHER PUBLICATIONS

Espacenet Machine Translation of WO2009/103725A3 (Year: 2009).*
Translation of WO2009103725 retrived from Espacenet (Year: 2009).*
International Search Report & Written Opinion for PCT/EP2017/063498 dated Jul. 25, 2017.
Combined Search and Examination Report for GB1611288.0 dated Dec. 7, 2016.

* cited by examiner

*Primary Examiner* — Jeffrey S Lundgren
*Assistant Examiner* — Ibrahim D Bori
(74) *Attorney, Agent, or Firm* — BakerHostetler; Toni-Junell Herbert

(57) ABSTRACT

The present invention relates to an emulsifiable concentrate composition, comprising (i) the pesticide tefluthrin; (ii) a solvent for dissolving tefluthrin; (iii) a water-soluble emulsifying surfactant system enabling an oil in water emulsion to be formed when the emulsifiable concentrate composition is diluted with an aqueous solution; (iv) a non-aqueous polar solvent for diluting the water-soluble emulsifying surfactant system; (v) a $C_2$-$C_{10}$-alcohol to provide physical compatibility between (a) hydrophobic component (ii)) and (b) hydrophilic components (iii) and (iv); to the preparation thereof and to a method of using such a composition to control pests in crops of useful plants.

19 Claims, No Drawings

EMULSIFIABLE CONCENTRATE OF TEFLUTHRIN

CROSS-REFERENCE TO RELATED APPLICATIONS

This application is a 371 National Stage application of International Application No. PCT/EP2017/063498, filed Jun. 2, 2017, which claims priority to U.S. Patent Application No. 62/348,059 filed Jun. 9, 2016 and Great Britain Application No. 1611288.0 filed Jun. 29, 2016, the entire contents of which applications are hereby incorporated by reference.

TECHNICAL FIELD

The present invention relates to an emulsifiable concentrate composition, to the preparation thereof and to a method of using such a composition to control pests in crops of useful plants.

BACKGROUND

Tefluthrin (TFT) is a pyrethroid insecticide widely used for corn root worm control via in furrow application at planting. TFT is applied in the form of granules or in the form of a liquid spray solution. In the currently used liquid spray solutions, TFT is formulated as a capsule suspension (CS). The reason for the encapsulation of TFT is the hazardous nature of the pyrethroid insecticides in general, and TFT more specifically. Such steps taken by formulators to reduce operator exposure to TFT may be beneficial in terms of direct operator exposure, however, such steps can result in reduced biological activity and can also lead to physical incompatibility with high ionic strength solutions such as for example liquid fertilizer products.

The formulated TFT product is typically applied alongside or via an admixture of liquid fertilizer and formulated product. The application of the admixture of liquid (aqueous) fertilizer and TFT product is problematic in that physical incompatibilities often exist which may lead to poor biological efficacy and/or problematic application of the admixtures. The problematic application of such admixtures manifestates itself in the necessity of extensive cleaning operations of the application equipment after the application has taken place which leads to potential operator exposure of TFT.

Thus, there is a need for a formulated TFT product which demonstrates a high degree of physical compatibility with carriers such as water of varying hardness, chemical makeup and temperatures as well as liquid fertilizers while at the same time providing similar or superior efficacy compared to existing commercial formulations. Such a TFT formulation would enable the use of closed delivery systems such as the John Deere CIS and Raven direct injection systems which in turn would decrease the need for manual intervention and cleaning operations thus limiting exposure of operators to TFT. The current invention provides such a novel TFT formulation which exhibits the above benefits. Thus, the current invention provides a novel emulsifiable concentrate which is stable, i.e. does not show phase separation, and is suitable for dilution with water or water-based fertilizers.

WO2009/019299 disclose microemulsions, i.e. oil-in-water emulsions where water forms the continuous phase and the average particle size of the oil phase does not exceed 200 nm, of low water-soluble active ingredients.

SUMMARY OF THE INVENTION

In a first aspect, the current invention provides as embodiment 1 a single-phase emulsifiable concentrate (EC) composition, comprising (i) the pesticide tefluthrin;

(ii) a solvent for dissolving tefluthrin;

(iii) a water-soluble emulsifying surfactant system enabling an oil in water emulsion to be formed when the emulsifiable concentrate composition is diluted with an aqueous solution;

(iv) a non-aqueous polar solvent for diluting the water-soluble emulsifying surfactant system;

(v) a $C_2$-$C_{10}$-alcohol to provide physical compatibility between (a) hydrophobic component (ii) and (b) hydrophilic components (iii) and (iv).

In a second aspect, there is provided an insecticidal composition obtained by diluting the EC compositions according to the first aspect in a suitable carrier, such as water or liquid fertilizer, such that the final concentration of TFT present is between 0.01 weight % and 10 weight % by weight of the total insectidal composition.

In a further aspect, there is provided a method for controlling a pest comprising diluting an amount of an EC composition according to the first aspect with a suitable liquid carrier, in particular an aqueous liquid carrier, such as water or liquid fertilizer, and then applying the dilute composition to the plant propagation material, plant or locus thereof.

DETAILED DESCRIPTION OF THE INVENTION

The term "single-phase" as used herein denotes a single-phase homogenous solution at room temperature (20-25° C.). The visual presence of solids and/or of two distinct liquid phases would be unacceptable non single-phase behavior.

The term "emulsifiable concentrate" or "EC" as used herein relates to a concentrated oil-based formulation. Small amounts of water may be present in an EC (<5% by weight) but said water cannot be present as a discrete phase. The ECs are transparent and will only be diluted with water or water-based fertilizers directly before application and form white to off-white dilutes.

The term "tefluthrin" or "TFT" as used herein refers to the pesticide with the common name "tefluthrin" having the CAS (Chemical Abstracts Service) registry number 79538-32-2 and chemical abstracts name (2,3,5,6-tetrafluoro-4-methylphenyl)methyl (1R,3R)-rel-3-[(1Z)-2-chloro-3,3,3-trifluoro-1-propen-1-yl]-2,2-dimethylcyclopropanecarboxylate.

The term "solvent for dissolving tefluthrin" as used herein means any solvent, or combination of solvents, capable of completely dissolving from 20 to 80 weight % tefluthrin. Examples of suitable solvents include but are not limited to mixtures of aromatic hydrocarbons such as Aromatic/Solvesso® 100, 150, 150ND, 200 and 200ULN (ExxonMobil Chemical), $C_4$-$C_{12}$ aliphatic methyl or ethyl esters (e.g. Steposol C-25®, Steposol C-40®, Steposol C-42®, Steposol C-48® and Steposol C-65® (Stepan), Agnique ME 610 and Aqnique ME810 (BASF)), methylated seed oil blends such as methylated sobybean oil, methyl oleate/linoleate, palmitate, carboxylic acids ($C_4$-$C_{10}$), ethyl esters ($C_4$-$C_{10}$), aliphatic mineral oils, and mixtures thereof.

The term "water-soluble emulsifying surfactant system" as used herein means any emulsifying surfactant system which enables the forming of an oil in water emulsion when the emulsifiable concentrate is diluted with an aqueous solution. Such an emulsifying surfactant system may comprise one or more surfactant. The surfactants may be non-ionic, anionic, cationic or Zwitterionic. Examples of particular suitable surfactants include but are not limited to alkyl polyglycosides, polyalkylene oxide block copolymers and polyaryl-phenyl ether phosphates.

Alkyl polyglycosides include Agnique® PG ("APG") 8107 (Cognis Corporation, Cincinnati, Ohio, USA) (an alkyl polyglycoside in which the alkyl group contains 8 to 10 carbon atoms and has an average degree of polymerization of 1.7), Agnique® PG 9116 (Cognis Corporation, Cincinnati, Ohio, USA) (an alkyl polyglycoside in which the alkyl group contains 9 to 11 carbon atoms and has an average degree of polymerization of 1.6) and Agnique® PG 8105 (Cognis Corporation, Cincinnati, Ohio, USA) (an alkyl polyglycoside in which the alkyl group contains 8 to 10 carbon atoms and has an average degree of polymerization of 1.5).

Polyalkylene oxide block copolymers can be di- and tri-block copolymers, such as ABA or BAB block copolymer or BA block copolymers. Examples include the Genapol® PF series (Clariant), the Pluronic® series (BASF), the Synperonic® PE series (Uniqema), and the Toximul® series (Stepan Chemical Co.). A preferred group of ethylene oxide/propylene oxide block copolymers for use in the compositions of this invention are butyl based poly (oxypropylene)/poly(oxyethylene)block copolymers having an average molecular weight in the range of 2400 to 3500, for example Toximul® 8320, Stepan Chemical Co.). Suitable examples include Pluronic® L10, Pluronic® L44, Pluronic® L63, Pluronic® L64, Pluronic® L84, Pluronic® P104, Pluronic® P105, Step-Flow® 26, Toximul® 8323 and Toximul® 8320.

Polyaryl-phenyl ether phosphates include ethoxylated tristyrylphenol phosphates such as Soprophor® 3D33 (Rhodia), Soprophor 3D33 LN® (Rhodia), Emulsogen 57® (Clariant), Agnique PE TSP-16A® (BASF), Agrhospec 7822® (Rhodia), Dispersogen TP 160® (Clariant), Stepfac TP 160® (Stepan), Stepfac TSP-PE® (Stepan). The degree of ethoxylation of the polyaryl-phenyl ether phosphates for this purpose is preferably between 8 and 20, more preferably between 14 and 18.

The term "non-aqueous polar solvent" as used herein means solvents having Hansen Solubility Parameter (HSP) values greater than 2, in particular greater than 5 and more particularly between 5 and 15. Examples of suitable non-aqueous polar solvents include acetone, amyl acetate, butanol, benzyl alcohol, cetyl alcohol, dimethyl ether, propylene glycol, dipropylene glycol, diethylene glycol monomethyl ether, octanol, hallcomid M-8-10, hexylene glycol, cyclohexanol, ethyl lactate, ethyl alcohol, 2-ethyl hexanol, glycerol monoacetate, glycerol diacetate, glycerol triacetate, 3-hexanol, n-hexyl alcohol, isopropyl myristate, lactic acid, lactic acid 2-ethyl hexyl ester, lactic acid n-propyl ester, methyl alcohol, methyl n-amyl ketone, methyl isobutyl ketone, oleyl alcohol, propanol, tetrahydrofurfuryl alcohol, butyrolactone, chlorobenzene, diacetone alcohol, n-decanol, N,N-dimethyl decanamide, N,N-dimethyl octanamide, dimethyl lactamide, n-decyl alcohol, dipropyleneglycol monomethylether, ethylene glycol monobutyl ether, isobornyl acetate, isobutyl alcohol, mesityl oxide, methyl ethyl ketone, 2-methyl-2,4-pentanediol, N-octyl pyrrolidone, N-methyl pyrrolidone, n-octyl alcohol, oxo-decyl acetate, oxo-heptyl acetate, oxo-hexyl acetate, oxo-nonyl acetate, oxo-octyl acetate, oxo-tridecyl acetate, propylene glycol monomethyl ether, triethylene glycol, triethyl phosphate, lactic acid n-butyl ester, lactic acid ethyl ester, dodecyl pyrrolidone, N,N-dimethyl acetamide, propylene carbonate and mixtures thereof. In particular, the non-aqueous polar solvent is selected from propylene glycol, dipropylene glycol, dipropylene mono-methyl glycol ether and mixtures thereof.

As used herein, the term "Hansen Solubility Parameters" (HSP) refers to system of describing solute solubility in a solvent based on the non-polar parameter, polar parameter, hydrogen bonding parameter, and total solubility parameter as disclosed in "Hansen Solubility Parameters" by Charles M. Hansen, ISBN 0-8493-7248-8. For definition of Hh=Hydrogen Bonding Solubility Parameter, see page 17 of the above book. For definition of Hp=Polar Solubility Parameter see page 16-17 of the above book.

The term "$C_2$-$C_{10}$-monohydric alcohol" as used herein refers to saturated aliphatic straight or branched alcohols with 2 to 10 carbon atoms and having one hydroxyl group.

Embodiments 1 to 13 provide preferred embodiments of the invention. It is understood that each preferred embodiment may be combined with one or more of the other preferred embodiments.

In embodiment 2, there is provided the single-phase emulsifiable concentrate composition according to embodiment 1, wherein (v) the $C_2$-$C_{10}$-alcohol is selected from ethanol, 1-hexanol, 1-octanol and 1-decanol, in particular 1-octanol.

In embodiment 3, there is provided the single-phase emulsifiable concentrate composition according to embodiment 1 or 2, wherein (iii) the water-soluble emulsifying surfactant system comprises one alkyl polyglycoside surfactant.

In embodiment 4, there is provided the single-phase emulsifiable concentrate composition according to any one of embodiments 1 to 3, wherein (iii) the water-soluble emulsifying surfactant system comprises one polyalkylene oxide block copolymer.

In embodiment 5, there is provided the single-phase emulsifiable concentrate composition according to any one of embodiments 1 to 4, wherein (iii) the water-soluble emulsifying surfactant system comprises one polyaryl-phenyl ether phosphate.

In embodiment 5.1, there is provided the single-phase emulsifiable concentrate composition according to any one of embodiments 1 to 4, wherein the weight ratio of component (v) to component (iii) in the composition is from 1:1.5 to 1:15, particularly from 1:3 to 1:8, more particularly from 1:4 to 1:6.

In embodiment 6, there is provided the single-phase emulsifiable concentrate composition according to any one of embodiments 1 to 5, wherein (iv) the non-aqueous polar solvent is selected from propylene glycol, dipropylene glycol and dipropylene mono-methyl glycol ether, or a mixture thereof.

In embodiment 7, there is provided the single-phase emulsifiable concentrate composition according to any one of embodiments 1 to 6, wherein (ii) the solvent for dissolving tefluthrin comprises one aromatic hydrocarbon or one $C_6$-$C_{12}$-alkyl-C(═O)—$CH_3$, or a mixture thereof.

In embodiment 8, there is provided the single-phase emulsifiable concentrate composition according to any one of embodiments 1 to 7, wherein (ii) the solvent for dissolving tefluthrin is a mixture of aromatic hydrocarbons.

In embodiment 9, there is provided the single-phase emulsifiable concentrate composition according to any one of embodiments 1 to 8, wherein the weight % of component (v) in the emulsifiable concentrate composition is from 2 to 10 weight %.

In embodiment 10, there is provided the single-phase emulsifiable concentrate composition according to any one of embodiments 1 to 9, wherein the weight % of component (v) in the emulsifiable concentrate composition is from 4 to 6 weight %.

In embodiment 11, there is provided the single-phase emulsifiable concentrate composition according to any one of embodiments 1 to 10, wherein the combined weight % of components (i) and (ii) in the emulsifiable concentrate composition is from 60 to 80 weight %.

In embodiment 12, there is provided the single-phase emulsifiable concentrate composition according to any one of embodiments 1 to 11, wherein the combined weight % of components (i) and (ii) in the emulsifiable concentrate composition is from 65 to 75 weight %.

In embodiment 13, there is provided the single-phase emulsifiable concentrate composition according to any one of embodiments 1 to 12, wherein the weight % of components (i) to (v) in the emulsifiable concentrate composition are (i) 20-30 weight %;
(ii) 40-50 weight %;
(iii) 15-25 weight %;
(iv) 2-15 weight %; and
(v) 2-10 weight %.

The term "compositions of the present invention", "compositions of the current inventions" or "inventive EC compositions" as used herein mean compositions according to any one of embodiments 1 to 13.

The following advantages of the emulsifiable concentrate (EC) compositions of the present invention have been surprisingly found:

(a) no separation due to two phase system (oil and water);
(b) no sedimentation when EC is diluted with an aqueous solution;
(c) excellent physical compatability with liquid fertilizers;
(d) storage-stability for extended periods;
(e) application in the field possible with closed delivery system such as John Deere CIS and Raven direct injection system, thereby avoiding exposure of operators to the hazardous material;
(f) improved cleanout properties: ease of cleaning the delivery system significantly improved compared to current commercial offerings, thereby decreasing the time operators may be exposed to the hazardous material.

In a further aspect, the current invention provides a method for controlling a pest comprising diluting an amount of an EC according to any one of embodiments 1 to 13 with a suitable liquid carrier, in particular an aqueous liquid carrier, such as water or liquid fertilizer, and then applying the dilute composition to the plant propagation material, plant or locus thereof. In a particular embodiment, the pest is corn root worm. In another particular embodiment, the dilute composition is applied by in furrow or T-band type application. The composition of the present invention may also be combined in a continuous flow apparatus with water in spray application equipment, such that no holding tank is required for the diluted product.

The inventive EC compositions can be stored conveniently in a container from which it is poured, or pumped, or into which a liquid carrier is added prior to application.

In another aspect, the invention also relates to insecticidal compositions obtained by diluting the EC compositions according to any one of embodiment 1 to 13 in a suitable carrier, such as water or liquid fertilizer, such that the final concentration of TFT present is between 0.01 weight % and 10 weight % by weight of the total insectidal composition.

Other active ingredients such as herbicides, plant growth regulators, algicides, fungicides, bactericides, viricides, insecticides, acaridicdes, nematicides or molluscicides may be present in the EC compositions of the present invention or may be added as a tank-mix partner to the dilute spray compositions prepared therefrom.

In addition, the EC compositions of the invention may further comprise other additives. Such additives include safeners, thickeners, flow enhancers, wetting agents, antifoaming agents, biocides, buffers, chelating agents, lubricants, fillers, drift control agents, deposition enhancers, evaporation retardants, frost protecting agents, insect attracting odor agents, UV protecting agents, fragrances, and the like. These additives are known to a person skilled in the art.

The liquid fertilizers may comprise, for example, either nitrogen based fertilizers or nitrogen, phosphorous and/or potassium. Examples of liquid fertilizers include but are not limited to 10-34-0;
2-15-19-3S (Conklin);
3-18-18 (Conklin);
32-0-0;
4-10-10 (Pearl City Elevator);
4-10-10 w/zinc 9% EDTA (Pearl City Elevator);
4-10-10 w/zinc Triple Crown (Pearl City Elevator);
5 parts 8-24-0, 1 part Sidekick (Conklin);
8-16-11-2S (Conklin);
8-24-0 (Conklin);
8-24-4;
9-18-9 f(Conklin);
Ascend PGR;
Aventine;
Chadwick Oil and Ag 6-24-6 (¼ Zn);
Co-Alliance with Micros;
Gavilon 120 LC;
Helena Nucleus HyperLink HP 8-24-4;
Helena Nucleus 0-Phos 8-24-0;
Helena Nucleus Ortho-Phos NPK ZN 7-21-2;
Hi-Test Complete Nutritional Starter (8-18-4);
HyperLink;
HyperLink XL;
Insta-Gro 3-18-18-1;
Insta-Gro 5-20-5-1;
Insta-Gro 9-18-9-1;
Mixture of Nresponse (24-0-0-1S), eNhance, and Pro-Germinator (9-24-3) (Agro-culture Liquid Fertilizers);
Morral Companies 9-18-9-1S-0.1Zn;
Nachurs 6-24-6+S;
Nachurs 9-18-9;
Nachurs 9-20-3+S;
Nachurs G24 (6-24-6);
Nachurs LKW20 (9-20-3);
Nachurs Upstart (6-20-6);
Nachurs W18-S (9-18-9-1);
Nutra-Flow GoldStart (6-24-6);
P Max Plus (7-20-3);
PhosPlus;
PhosPlus+9-15-4;
Pro-Valley Gold;
Redline;
RiseR 7-17-3;
Twin States Liquibrom;
X-Cell Growth Boost;
X-Cell MicroNutrient Supplement;

The EC compositions of the present invention may be prepared by charging a solvent (ii) according to embodiment 1 into a vessel, then charging solvent (v) according to embodiment 1 to the same vessel and mixing until homogenous, then adding the TFT solution followed by solvent (iv) according to embodiment 1 and mixing the whole until homogenous. The water-soluble emulsifying surfactant system (iii) according to embodiment 1 is then added and the whole mixed until homogenous.

The following examples illustrate further the invention but are not intended to limit its scope.

Experimental

Formulation Preparation:

1. Charge aromatic fluid to vessel.
2. Charge n-octanol to the vessel and mix until homogenous.
3. Charge pre-heated (50° C.) dissolved TFT to the vessel and mix until homogenous.
4. Charge dipropylene glycol and mix until homogenous.
5. Charge pre-heated Toximul 8320 (40-50° C.) and mix until homogenous.
6. Charge pre-heated Soprophor 3D33 (40-50° C.) and mix until homogenous.
7. Charge pre-heated Agnique PG-8107 (40-50° C.) and mix until homogenous.

(a) Separation Due to Two Phase System (Oil and Water):

TABLE 1

The following EC formulations 1-4 were prepared. The total weight for each batch was 20 grams.

| | Components (Function) | | | |
|---|---|---|---|---|
| | 1 | 2 | 3 | 4 |
| TFT in Aromatic 100 ® (Active ingredient) | 1.6 | 1.6 | 2.0 | 2.0 |
| Toximul ® 8320:Soprophor ® 3D33 -= 1:2 (Emulsifiers) | 1.9 | 1.4 | 1.5 | 1.0 |
| Dipropylene glycol (Non-aqueous polar solvent) | 1.5 | 2.0 | 1.5 | 2.0 |
| Agnique ® 8107 (Emulsifier) | 15.0 | 15.0 | 15.0 | 15.0 |
| Total weight (grams) | 20 | 20 | 20 | 20 |

Formulations 1-4 showed turbidity and the two phases (oil and water) separated after a short time. Comparison testing was carried out on formulation 4 above in order to solve the phase separation problem.

TABLE 2

Comparison testing on formulation 4. 10 grams of formulation 4 were taken for each comparison test. Solvents were added in increments of 0.25 grams up to maximum of 2 grams or until cloudiness of formulation cleared. Phase separation was checked 1 hour and 72 hours after the addition of the solvents.

| Solvent Added | Cloudiness | 0 C (1 hr) | 0 C (72 hr) |
|---|---|---|---|
| Dipropylene glycol | Does not clear | Not tested | Not tested |
| Rhodiasolv ® RDPE | Clear at + 1.25 g | Phases separated | Not tested |
| Stepan C25 ® | Clear at + 1.50 g | Phases separated | Not tested |
| 1-Hexanol | Clear at 0.25 g | Clear | Clear |
| Solvent Added | Cloudiness | 0 C (1 hr) | 0 C (72 hr) |
| 1-Octanol | Clear at + 0.25 g | Clear | Clear |
| 1-Decanol | Clear at + 0.25 g | Clear | Clear |
| Dipropylene glycol monomethyl ether | Clear at + 0.75 g | Phases separated | Not tested |
| Rhodiasolv ® Polarclean | Clear at + 1.0 g | Phases separated | Not tested |
| Dimethyl glutarate | Clear at + 1.25 g | Phases separated | Not tested |
| Propylene glycol | Does not clear | Not tested | Not tested |

It was found that the hydrophilic and hydrophobic phases surprisingly do not separate after 1 hour and 72 hours when 1-hexanol, 1-octanol and 1-decanol was added to the EC.

(b) Sedimentation when EC is Diluted with an Aqueous Solution:

TABLE 3

Formulations 5-8 were prepared due to the findings under (a). The composition is given as weight % of the total weight of the composition.

| | Components (Function) in weight % | | | |
|---|---|---|---|---|
| | 5 | 6 | 7 | 8 |
| TFT (Active ingredient) | 25.00 | 25.00 | 25.00 | 25.00 |
| Aromatic 100 ® (solvent) | 44.69 | 44.69 | 45.00 | 45.00 |
| Dipropylene glycol | 9.50 | 7.00 | 7.50 | 5.00 |
| 1-Octanol | 5.00 | 5.00 | 5.00 | 5.00 |
| Agnigue ® 8107 (Emulsifier) | 7.50 | 10.00 | 7.50 | 10.00 |
| Toximul ® 8320 (Emulsifier) | 2.78 | 2.78 | 3.33 | 3.33 |
| Soprophor ® 3D33 (Emulsifier) | 5.53 | 5.53 | 6.67 | 6.67 |
| Total | 100 | 100 | 100 | 100 |

Dilution tests: Formulations 1-8 are diluted at 5% v/v in a 100 ml (milliliter) graduated cylinder using water with a water hardness of 1000 ppm. Samples are checked periodically for sedimentation or phase separation and then re-homogenized after 24 hrs. Re-homogenization is recorded as the number of cylinder inversions needed to re-suspend all separated material. Re-suspension effort is checked again after another 72 hours to check for long term compatibility. The results are shown in Table 4.

TABLE 4

After dilution with water, the samples were checked for sedimentation or phase separation (scale of 0-3, 0 indicating no sedimentation or phase separation and 1-3 indicating sedimentation or phase separation, 1 being least sedimentation/phase separation to 3 most) at 1, 3, 18 hours after dilution and then after 72 hours.

| Formulation | 1 hour | 3 hours | Sedimentation or phase separation | 18 hours | Sedimentation or phase separation | Inversions to Re-homogenize | 72 hours | Inversions to Re-homogenize |
|---|---|---|---|---|---|---|---|---|
| 1 | 1 | 2 | sediment | 2 | sediment | 2 | 2 | 2 |
| 2 | 1 | 1 | sediment | 2 | sediment | 2 | 2 | 2 |

TABLE 4-continued

After dilution with water, the samples were checked for sedimentation or phase separation (scale of 0-3, 0 indicating no sedimentation or phase separation and 1-3 indicating sedimentation or phase separation, 1 being least sedimentation/phase separation to 3 most) at 1, 3, 18 hours after dilution and then after 72 hours.

| Formulation | 1 hour | 3 hours | Sedimentation or phase separation | 18 hours | Sedimentation or phase separation | Inversions to Re-homogenize | 72 hours | Inversions to Re-homogenize |
|---|---|---|---|---|---|---|---|---|
| 3 | 1 | 2 | sediment | 2 | sediment | 2 | 2 | 3 |
| 4 | 1 | 2 | sediment | 2 | sediment | 2 | 2 | 2 |
| 5 | 0 | Not Tested | Not tested | Trace | Phase separation | 1 | 1 | 1 |
| 6 | 0 | Not Tested | Not tested | Trace | Phase separation | 1 | 1 | 1 |
| 7 | 0 | Not Tested | Not tested | Trace | Phase separation | 1 | 1 | 1 |
| 8 | 0 | Not Tested | Not tested | Trace | Phase separation | 1 | 1 | 1 |

(c) Physical Compatability with Up to 40 Liquid Fertilizers:

Formulation 9, which is the same as formulation 8 above only that Aromatic 100® has been replaced with Aromatic 150®, and the current commercial aqueous capsule suspension product (formulation 10) have been tested for compatibility with a large range of liquid fertilizers. The procedure for this compatibility test was as follows:

1) 150 ml of liquid fertilizer was added into a glass jar.

2) 12 ml (about 2% v/v) of formulations 9 and 10 were added into the glass jar.

3) Samples were inverted 10 times.

4) Separation, sediment, flocculation, etc., was observed.

Dynamic Test:

5) The formulation was shaken for 1 hour at 375 cycles per minute.

6) Remove samples from shaker and allow to suit undisturbed at least for 2 minutes but no longer than 10 minutes. Visual observations such as sediment, flocculation, separation of layers, scum on jar sides, etc.

7) Jars were then shaken and the contents poured through stacked 50 and 100 US standard mesh screens. 50 ml of water was then added into the jars, recapped, shaken and poured through the screens. The type and amount of any residue on jar and/or screen was noted and also whether the residue could be removed via rinsing.

Static Test:

8) Samples were left overnight and any sediments, flocculation, separation of layers, scum on jar sides, etc. was recorded.

9) Samples were inverted up to 10 times and then shaken for about 10 seconds if necessary to re-mix sample.

10) Contents of the jars was then poured through the stacked 50 and 100 standard mesh screens similar as under 7) and the type and amount of any residue on jar and/or screen was noted and also whether the residue could be removed via rinsing.

Rating Scale for Compatibility:

"Compatible"=no separation, no sediment, and no residue on jar or screen.

"Compatible with agitation"=separation or sediment re-mixed easily; screen and jar were clear after rinsing.

"Marginally compatible with agitation-sediment"=separation and/or sediment required up to 10 inversions and/or shaking to re-mix. Moderate residue remained on screen and/or jar remained. Recommendation to end user of such "marginally compatible" dilutions is that a tank clean up will be required if the tank-mixture is left to sit for an extended period of time (2-6 hours), and that the tank-mixture should not be left to sit overnight.

"Incompatible"=moderate to heavy residue remained on jar and/or screen after rinsing.

TABLE 5

Formulations 9 and 10 were diluted with commercial liquid fertilizers and then the procedure 1)-10) above was applied. The compatibility rating scale was then applied.

| Fertilizer | Formulation 9 | Formulation 10 |
|---|---|---|
| 10-34-0 (commodity material, multiple manufacturers) | Compatible | Marginally Compatible (Heavy residue rinsed through sieves) |
| 2-15-19-3S (Conklin) | Compatible | Compatible |
| 3-18-18 (Conklin) | Compatible | Marginally Compatible (Heavy residue rinsed through sieves) |
| 32-0-0 (commodity material, multiple manufacturers) | Compatible | Compatible |
| 4-10-10 (Pearl City Elevator) | Compatible | Compatible |
| 4-10-10 w/zinc 9% EDTA (Pearl City Elevator) | Compatible | Compatible |
| 4-10-10 w/zinc Triple Crown (Pearl City Elevator) | Compatible | Compatible |
| 5 parts 8-24-0, 1 part Sidekick (Conklin) | Compatible | Marginally Compatible (Heavy residue rinsed through sieves) |
| 8-16-11-2S (Conklin) | Compatible | Compatible |
| 8-24-0 (Conklin) | Compatible | Marginally Compatible (Heavy residue rinsed through sieves) |
| 9-18-9 f (Conklin) | Compatible | Marginally Compatible (Heavy residue rinsed through sieves) |
| Ascend PGR (Winfield Solutions LLC) | Compatible | Compatible |
| Aventine (CHS Inc) | Compatible | Compatible |
| Chadwick Oil and Ag 6-24-6 (1/4 Zn) (Chadwick Oil and Ag Inc) | Compatible | Marginally Compatible (Heavy residue rinsed through sieves) |
| Gavilon 120 LC | Compatible | Compatible |
| Helena Nucleus O-Phos 8-24-0 | Compatible | Compatible |
| Helena Nucleus Ortho-Phos NPK ZN 7-21-2 | Compatible | Marginally Compatible (Heavy residue rinsed through sieves) |
| Hi-Test Complete Nutritional Starter (8-18-4) (High Test Labs) | Compatible | Marginally Compatible (Heavy residue rinsed through sieves) |
| HyperLink (Helena Chemical Co) | Compatible | Marginally Compatible (Heavy residue rinsed through sieves) |
| Insta-Gro 3-18-18-1 (Insta-gro | Compatible | Marginally Compatible |

TABLE 5-continued

Formulations 9 and 10 were diluted with commercial liquid fertilizers and then the procedure 1)-10) above was applied. The compatibility rating scale was then applied.

| Fertilizer | Formulation 9 | Formulation 10 |
|---|---|---|
| Manufacturing Inc) | | (Heavy residue rinsed through sieves) |
| Insta-Gro 5-20-5-1 (Insta-gro Manufacturing Inc) | Compatible | Marginally Compatible (Heavy residue rinsed through sieves) |
| Insta-Gro 9-18-9-1 (Insta-gro Manufacturing Inc) | Compatible | Marginally Compatible (Heavy residue rinsed through sieves) |
| Mixture of Nresponse (24-0-0-15), eNhance, and Pro-Germinator (9-24-3) (Agro-culture Liquid Fertilizers) | Compatible | Compatible |
| Morral Companies 9-18-9-1S-0.1Zn (Morral Co) | Compatible | Marginally Compatible (Heavy residue rinsed through sieves) |
| Nachurs 6-24-6 + S (Nachurs Alpine Solutions) | Compatible | Marginally Compatible (Heavy residue rinsed through sieves) |
| Nachurs 9-18-9 (Nachurs Alpine Solutions) | Compatible | Marginally Compatible (Heavy residue rinsed through sieves) |
| Nachurs LKW20 (9-20-3) (Nachurs Alpine Solutions) | Compatible | Marginally Compatible (Heavy residue rinsed through sieves) |
| Nachurs Upstart (6-20-6) (Nachurs Alpine Solutions) | Compatible | Marginally Compatible (Heavy residue rinsed through sieves) |
| Nachurs W18-S (9-18-9-1) (Nachurs Alpine Solutions) | Compatible | Marginally Compatible (Heavy residue rinsed through sieves) |
| Nutra-Flow GoldStart (6-24-6) (The Andersons) | Compatible | Marginally Compatible (Heavy residue rinsed through sieves) |
| P Max Plus (7-20-3) (Rosen's Inc) | Compatible | Marginally Compatible (Heavy residue rinsed through sieves) |
| PhosPlus (Biofeed Solutions Inc) | Compatible | Compatible |
| PhosPlus + 9-15-4 (United Suppliers Inc) | Compatible | Compatible |
| Redline (West Central Inc) | Compatible | Compatible |
| RiseR 7-17-3 (Loveland Products Inc) | Compatible | Compatible |
| Twin States Liquibrom (Twin State Inc) | Compatible | Marginally Compatible (Heavy residue rinsed through sieves) |
| X-Cell Growth Boost (Soil-Biotics) | Compatible | Compatible |
| X-Cell MicroNutrient Supplement (Soil-Biotics) | Compatible | Compatible |

It has surprisingly been found that Formulation 9 is compatible with all of the major liquid fertilizers and can thus be advantageously applied in the field.

(d) Improved Cleanout Properties:

The following protocol was used to test the cleanout properties of formulation 9 in comparison with formulation 10:

1. The initial dry weight of individual pieces was recorded and that will be used during the testing to set a baseline for comparisons.

2. The formulation was applied to each material in a manner that is consistent with the actual application scenario.

3. The formulation allowed to sit/dry off for 7 days.

4. After the 7 days period, a standard cleaning process was performed for each item (different for each item used).

5. Coupler parts were wiped with a wet rag to clean and remove any material left from the formulation.

6. Filter and filter bowls were cleaned by pumping water through them at a rate of 25 oz. (708.34 grams)/min for 2 and 5 minutes.

7. Hose material was also cleaned by pumping 25 oz./min of fresh water through for 2 and 5 minutes.

8. Nozzles and caps were rinsed lightly with water.

9. Red Ball monitors were cleaned by pumping approximately 40 oz./min of fresh water through for 2 and 5 minutes.

10. After each item was rinsed/cleaned, any residue remaining was allowed to dry down and a final dry weight (for the filters, hoses and red balls repeat this for the 2 min flush and the 5 min flush) was recorded.

MASTERFLEX® pump was used to precisely pump desired flow rate through select materials

TABLE 6

The results for formulation 9 and 10 using the above protocol:

| | Formulation 9 | | Formulation 10 | | Residue remaining (g) | |
|---|---|---|---|---|---|---|
| Items | Initial weight (g) | Final weight (g) | Initial weight (g) | Final weight (g) | Formulation 9 | Formulation 10 |
| Colder Couplers | 30.0 | 30.1 | 29.2 | 30.3 | 0.1 | 1.1 |
| Spray Nozzles | 10.6 | 10.8 | 10.7 | 11.0 | 0.2 | 0.3 |
| Filter Housing + Strainer | 22.1 | 25.3 | 21.7 | 39.6 | 3.2 | 17.9 |
| Red Ball Monitors | 167.7 | 171.1 | 167.7 | 175.0 | 3.4 | 7.3 |
| Hose | 51.8 | 52.4 | 50.8 | 55.2 | 0.6 | 4.7 |

It was found that formulation 9 surprisingly provided much improved cleanout properties compared with the current commercial aqueous capsule suspension (formulation 10).

The invention claimed is:

1. A single-phase emulsifiable concentrate composition, comprising (i) the pesticide tefluthrin;

(ii) a solvent for dissolving tefluthrin;

(iii) a water-soluble emulsifying surfactant system enabling an oil in water emulsion to be formed when the emulsifiable concentrate composition is diluted with an aqueous solution;

(iv) a non-aqueous polar solvent for diluting the water-soluble emulsifying surfactant system; and (v) a $C_2$-$C_{10}$-monohydric alcohol to provide physical compatibility between (a) hydrophobic component (ii) and (b) hydrophilic components (iii) and (iv), wherein the $C_2$-$C_{10}$-monohydric alcohol is selected from ethanol, 1-hexanol, 1-octanol, and 1-decanol; and wherein the single-phase emulsifiable concentrate is essentially free of water.

2. The composition according to claim 1, wherein (v) the $C_2$-$C_{10}$-monohydric alcohol is selected from 1-hexanol, 1-octanol and 1-decanol.

3. The composition according to claim 1, wherein (iii) the water-soluble emulsifying surfactant system comprises one alkyl polyglycoside surfactant.

4. The composition according to claim 1, wherein (iii) the water-soluble emulsifying surfactant system comprises one polyalkylene oxide block copolymer.

5. The composition according to claim 1, wherein
(iii) the water-soluble emulsifying surfactant system comprises one polyaryl-phenyl ether phosphate.

6. The composition according to claim 1, wherein
(iv) the non-aqueous polar solvent is selected from propylene glycol, dipropylene glycol and dipropylene mono-methyl glycol ether, or a mixture thereof.

7. The composition according to claim 1, wherein
(ii) the solvent for dissolving tefluthrin comprises one aromatic hydrocarbon or one $C_4$-$C_{12}$ aliphatic methyl or ethyl ester, or a mixture thereof.

8. The composition according to claim 7, wherein
(ii) the solvent for dissolving tefluthrin is a mixture of aromatic hydrocarbons.

9. The composition according to claim 1, wherein
the weight % of component (v) in the emulsifiable concentrate composition is from 2 to 10 weight %.

10. The composition according to claim 9, wherein
the weight % of component (v) in the emulsifiable concentrate composition is from 4 to 6 weight %.

11. The composition according to claim 1, wherein
the combined weight % of components (i) and (ii) in the emulsifiable concentrate composition is from 60 to 80 weight %.

12. The composition according to claim 11, wherein
the combined weight % of components (i) and (ii) in the emulsifiable concentrate composition is from 65 to 75 weight %.

13. The composition according to claim 1, wherein
the weight % of components (i) to (v) in the emulsifiable concentrate composition are
(i) 20-30 weight %;
(ii) 40-50 weight %;
(iii) 15-25 weight %;
(iv) 2-15 weight %; and
(v) 2-10 weight %.

14. An insecticidal composition obtained by diluting the emulsifiable concentrate compositions according to claim 1 in a suitable carrier, such that the final concentration of tefluthrin present is between 0.01 weight % and 10 weight % by weight of the total insecticidal composition.

15. A method for controlling a pest comprising diluting an amount of an emulsifiable concentrate composition according to claim 1 with a suitable liquid carrier, in particular an aqueous liquid carrier, such as water or liquid fertilizer, and then applying the dilute composition to the plant propagation material, plant or locus thereof.

16. A composition, comprising
(i) the pesticide tefluthrin;
(ii) a solvent for dissolving tefluthrin, which solvent is a mixture of aromatic hydrocarbons;
(iii) a water-soluble emulsifying surfactant system enabling an oil in water emulsion to be formed when the emulsifiable concentrate composition is diluted with an aqueous solution;
(iv) a non-aqueous polar solvent for diluting the water-soluble emulsifying surfactant system, wherein the solvent is selected from propylene glycol, dipropylene glycol and dipropylene mono-methyl ether, or a mixture thereof; and
(v) a $C_2$-$C_{10}$-alcohol to provide physical compatibility between (a) hydrophobic component (ii) and (b) hydrophilic components (iii) and (iv), wherein $C_2$-$C_{10}$-alcohol is selected from ethanol, 1-hexanol, 1-octanol, and 1-decanol; and
wherein the composition is a single-phase emulsifiable concentrate.

17. The composition according to claim 16, wherein (iii) the water-soluble emulsifying surfactant system comprises one alkyl polyglycoside surfactant.

18. The composition according to claim 16, wherein (iii) the water-soluble emulsifying surfactant system comprises one polyalkylene oxide block copolymer.

19. The composition according to claim 16, wherein (iii) the water-soluble emulsifying surfactant system comprises one polyaryl-phenyl ether phosphate.

* * * * *